US009116390B2

(12) United States Patent
Powell et al.

(10) Patent No.: US 9,116,390 B2
(45) Date of Patent: Aug. 25, 2015

(54) TOUCH SENSING LIQUID CRYSTAL DISPLAY COMPATIBLE WITH LINEARLY POLARIZED SUNGLASSES

(75) Inventors: Karlton Powell, Lake Stevens, WA (US); Peggy Lopez, Lynnwood, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 63 days.

(21) Appl. No.: 13/594,887

(22) Filed: Aug. 27, 2012

(65) Prior Publication Data
US 2014/0055373 A1 Feb. 27, 2014

(51) Int. Cl.
*G06F 3/041* (2006.01)
*G02F 1/13357* (2006.01)
*G02F 1/1335* (2006.01)
*G02F 1/13363* (2006.01)
*G02F 1/1333* (2006.01)

(52) U.S. Cl.
CPC ........ *G02F 1/13363* (2013.01); *G02F 1/13338* (2013.01); *G02F 2001/133562* (2013.01); *G02F 2001/133638* (2013.01); *G02F 2413/01* (2013.01)

(58) Field of Classification Search
CPC ....... G06F 3/041; G06F 3/0414; G06F 3/042; G02F 1/13363; G02F 1/13338
USPC ......... 345/173–178; 349/61, 74, 96, 110, 114
See application file for complete search history.

(56) References Cited

U.S. PATENT DOCUMENTS

| 5,751,385 | A | 5/1998 | Heinze |
| 5,959,711 | A | 9/1999 | Silverstein et al. |
| 7,528,906 | B2 | 5/2009 | Robinson et al. |
| 7,872,641 | B2 * | 1/2011 | Abileah et al. ................. 345/173 |
| 7,911,565 | B2 * | 3/2011 | Zhong et al. .................... 349/98 |
| 8,085,644 | B2 | 12/2011 | Sharp |
| 8,115,892 | B2 | 2/2012 | Zhong et al. |
| 2005/0237440 | A1 | 10/2005 | Sugimura et al. |
| 2007/0008471 | A1 | 1/2007 | Wang et al. |
| 2007/0200259 | A1 | 8/2007 | Nakanishi et al. |
| 2008/0204610 | A1 | 8/2008 | Matsumoto et al. |
| 2008/0204611 | A1 | 8/2008 | Matsumoto et al. |
| 2010/0309145 | A1 * | 12/2010 | Chiang et al. ................. 345/173 |
| 2011/0128467 | A1 | 6/2011 | Miyazaki et al. |
| 2011/0148800 | A1 * | 6/2011 | Nishikawa et al. ........... 345/173 |

(Continued)

OTHER PUBLICATIONS

Komanduri, et al., "Multi-twist retarders for broadband polarization transformation", Retrieved at <<http://www.ece.ncsu.edu/oleg/files-wiki/0/0c/SPIE_12_Komanduri_MTR.pdf>>, Proc. of SPIE, vol. 8279, Feb. 15, 2012, pp. 1-10.

(Continued)

*Primary Examiner* — Andrew Sasinowski
(74) *Attorney, Agent, or Firm* — Jeremy Snodgrass; Sergey Lamansky; Micky Minhas

(57) ABSTRACT

A touch sensing liquid crystal display is made with a stack of layers that has controlled or low birefringence. The final layers of the output of the touch sensing liquid crystal display circularly polarize the output light. The combination of low birefringence and circularly polarized output light provides a touch sensing LCD that can be viewed from many angles with low visible artifacts, even through linear polarizing objects, such as sunglasses.

22 Claims, 2 Drawing Sheets

(56) References Cited

U.S. PATENT DOCUMENTS

2011/0181549 A1* 7/2011 Hotelling et al. ............ 345/174
2011/0227835 A1 9/2011 Lin

OTHER PUBLICATIONS

"International Search Report & Written Opinion for PCT Patent Application No. PCT/US2013/055501", Mailed Date: Dec. 3, 2013, Filed Date: Aug. 19, 2013, 13 Pages.

* cited by examiner

TOUCH SENSING LIQUID CRYSTAL DISPLAY COMPATIBLE WITH LINEARLY POLARIZED SUNGLASSES

BACKGROUND

Liquid crystal displays are used in many applications where the orientation of the viewer with respect to the display is not fixed. While generally not a problem, the output of the LCD is linearly polarized. If the viewer is looking at the display through another medium that also is a linear polarizer (such as sunglasses), the image on the display can present artifacts, have portions which are partially or fully extinct, be distorted, or be simply unviewable.

Today, many liquid crystal displays also include a touch sensing layer that allows the device to be used as a touch-based input device. The touch sensing layer, if part of the optical stack defining the liquid crystal display, is selected based on both its touch sensing properties (such as a dielectric constant for a capacitive touch sensitive layer) and optical properties (whether it is clear). Commonly used materials for a touch-sensitive layer, such as polyethylene teraphthalate (PET), can exhibit high birefringence, an optical property used to describe an optical media which has an index of refraction that may depend on the direction of light propagating through it, such that there may be an extraordinary index as well as an ordinary index of refraction. Such effect of non-isotropic index of refraction may be introduced by crystalline lattice structure, such as in uniaxial crystals, or a result of internal stresses in the media. Whether the birefringence is localized in a pseudo random manner across position, or uniform and substantially constant over the layer, light transmitted through a partially or fully birefringent layer may undergo a phase delay between orthogonal components of a linearly polarized input state such that the light exiting the layer may experience a change in the polarization state, which may include conversion of linear input to partially elliptical, rotated, or a combination thereof. When the conversion is not consistent or fundamental for a range of input wavelengths, or further the conversion is somewhat randomized with respect to position, the result can be variation of not only luminance across the field of view, but further may induce variation in state differently for various wavelengths, thus may further cause colorations across the field of view.

If there is any material in the optical stack of the LCD that has high birefringence, the light output by the top layer, a linear polarizer, may cause a rainbow-like artifact to appear on the displayed image, depending on the orientation of the viewer with respect to the display. If the viewer is looking at the display through another medium that is also a linear polarizer (such as sunglasses), this rainbow effect can be exacerbated.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A touch sensing liquid crystal display is made with a stack of layers that has controlled or low birefringence. The final layers of the output of the touch sensing liquid crystal display circularly polarize the output light. The combination of low birefringence and circularly polarized output light provides a touch sensing LCD that can be viewed from many angles with low visible artifacts, even through linear polarizing objects, such as sunglasses.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which a touch sensing liquid crystal display can be installed.

Figure 1:
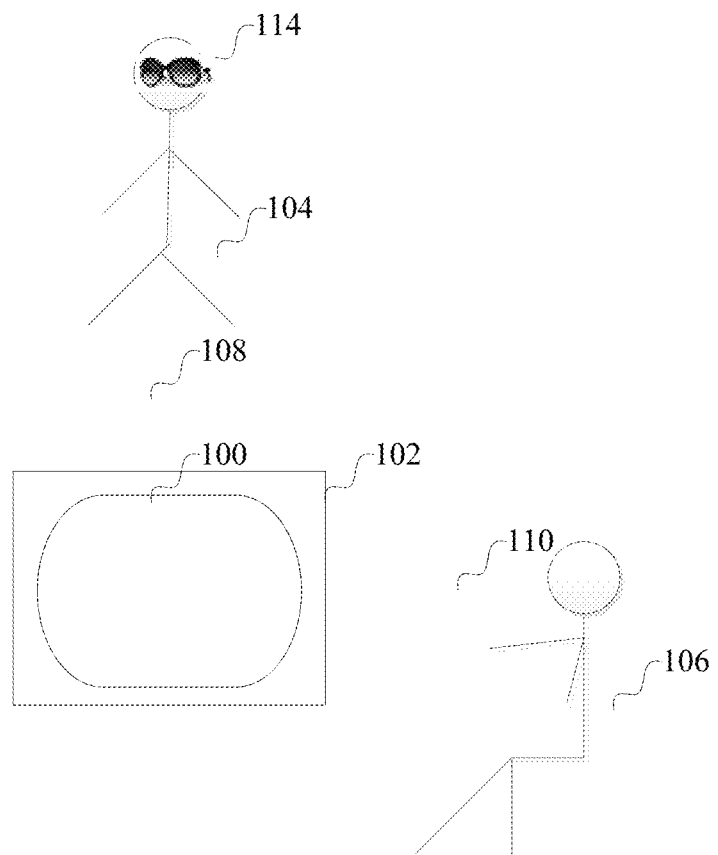
FIG. 1 is a diagram of a top view of a horizontally-oriented touch sensing liquid crystal display surface with individuals viewing the display from different angles.

Referring to FIG. 1, a touch sensing liquid crystal display 100 is positioned within a mounting cabinet 102 such that it is horizontally oriented, like a table. This orientation is merely intended as an example and not limiting of the present invention. Such a display can be vertically oriented, or oriented at an angle with respect to a vertical or horizontal plane. The display can be wall-mounted, mounted on a stand, or attached to another mechanism which allows its orientation to be changed by a viewer. Such a display can have computer inputs and/or video inputs to receive data from a computer or other device for display.

Given the example of a horizontally-oriented display in FIG. 1, one or more viewers 104, 106 can view the display from one or more positions 108, 110. A viewer can be sitting down, and thus have a viewing angle that is close to the plane of the display; while another viewer can be standing up. A viewer can be positioned at one side 110 of the display, viewing the display at an angle that is different from the viewing angle of the other viewer (while FIG. 1 shows viewer in only two orthogonal positions, viewers can be any orientation with respect to the display). A viewer also can view the display through a linearly polarizing filter, such as sunglasses 114 or a window.

If there is any material in the optical stack of the display 100 that has high birefringence, the light output by the top layer of the liquid crystal display, a linear polarizer, causes a rainbow-like artifact to appear on the displayed image, depending on the orientation of the viewer with respect to the display. If the viewer is looking at the display 100 through another medium that is also a linear polarizer (such as sunglasses 116), this rainbow effect can be exacerbated.

To solve this problem, the touch sensing liquid crystal display 100 is made with a stack of layers that has controlled or low birefringence. For limiting retardance induced by light transmitting through a film layer, it is desirable to limit or constrain the in-plane birefringence of that film to be low, compared to the wavelengths of light used, in this case the visible spectrum used in the display. The in plane birefringence of a film layer describes the character of a layer having extraordinary and ordinary index aligned within the plane of layer. While variation of the out-of-plane birefringence of a film layer can contribute to artifacts as well, such out-of-plane birefringence is typically much less significant than in-plane birefringence, and typically may exhibit some level of birefringence especially if the out-of-plane birefringence is fairly constant or flat across the wavelength range of light being used in the display. However, in-plane birefringence implies both extraordinary and ordinary indices lie within the plane of the film, often along orthogonal dimensions, and as such any light transmitted through such layer may exhibit retardance, or in other words a phase delay between S and P polarization states, thus changing the polarization state of the light. In addition to media having uniform birefringence with respect to position, a media may have localized internal stresses which induce localized, or in some cases randomized, birefringence. One example of such material is PET, which is often utilized as a substrate layer in capacitive touch panels. However, by selecting substrates having low birefringence, whether uniform or randomly distributed across media, the impact on linear polarized output of an LCD-based display may be realized. Also, a retardance layer on top of the top layer of the liquid crystal display is designed so as to circularly polarize the output light, by converting the linearly polarized display output into circularly polarized light. The combination of low birefringence and circularly polarized output light provides a touch sensing LCD that can be viewed from many angles with low visible artifacts, even through linear polarizing objects, such as sunglasses. This solution can be applied to transmissive, reflective, and transflective liquid crystal displays.

Given this context, an example implementation of a touch sensing liquid crystal display will be described in more detail in connection with FIGS. 2-3.

Figure 2:
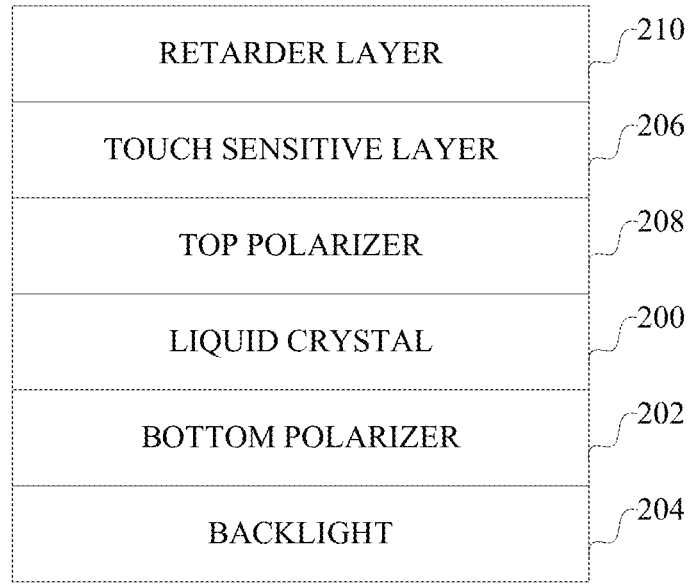
FIG. 2 is a schematic diagram of layers of an example touch sensing liquid crystal display.

In FIG. 2, a schematic diagram of an example layered structure of a touch sensing liquid crystal display will now be described. In this example, the touch sensing layer is a touch-sensitive layer such as a capacitive layer. Other examples of touch sensing layers include, but are not limited to, resistive layers and optical systems such as a wedge-based imaging system that can be used to identify objects contacting or in near-contact with a display surface. The touch sensing layer includes a transparent conductive layer and substrate which together are comprised of high transparency, high clarity, low birefringence materials. As an example an ITO layer may typically have greater than 85% transmission for the wavelengths of light used in the display, and many polymer films may exhibit greater than 90% transmission. High clarity may be defined as having low haze, which is a measure of the amount of transmitted light which is scattered, such example of low haze would include less than 1% to 3%. Low birefringence is defined as levels of birefringence having retardance on the order of a substantially small fraction of the wavelength, such as on order or less than 5%, or in other words for light having 420nm wavelength, use of film stack having less than 20nm birefringence. Constraining total effective birefringence also can impact display quality, and may be cumulative, such that use of film layers having on order of less than 10nm/cm to 15nm/cm may be desirable for improved reduction of artifacts.

Such a display includes a liquid crystal layer 200, which is typically constructed from one or more layers of different materials as is known in the art, such as a liquid crystal material sandwiched between two glass layers. The liquid crystal layer 200 allows individual pixels to be addressed and activated to emit red, green or blue light in varying intensities so as to give the appearance of different colors, and different brightness, or luminance. The display panel also can include a bottom linear polarizer layer 202 and a backlight 204, depending on the implementation. On top of the liquid crystal layer are a top polarizer 208 and a touch-sensitive layer 206. In some cases, the touch sensing layer and liquid crystal layer may be integrated.

The touch sensing layer 206 may be composed of multiple layers, such as a capacitive touch panel which is typically placed above the display panel, thus above the display panel's top polarizer. Various stacks may be used for the capacitive touch layer, which may include one or more conductive layers, one or more of which may be patterned. While robust designs may utilize glass as a substrate for the conductive layer, such as indium tin oxide (ITO) on glass, these stacks are less desirable for mobile applications as they tend to be thick, and often heavier in weight. In order to move toward a thinner stack, conductive layers may utilize a polymer film as the substrate. A common substrate media for the ITO layer is polyethylene teraphthalate (PET), which unfortunately exhibits substantial birefringence. As such, any retardance exhibited by the touch panel on the polarization state of the display panel output may induce a change in the state of the light out of touch panel layer. Further, if this retardance varies with position across the layer or varies with wavelength, artifacts may be visible to the eye. By replacing PET with polymer films which exhibit a much lower level of birefringence, the overall birefringence of the full optical stack including display and touch layers may be constrained to a low level.

On top of display is a retardance layer 210 that induces a phase delay between orthogonal components of linear polarized light. There may be hardened cover glass (not shown) on the very top of this stack, above the retardance layer. An example of such a cover glass is the GORILLA-brand glass, from Corning Incorporated. This glass can be coupled to the top of the stack, for example, by being optically bonded using a liquid UV-curable resin or polymer.

The function of the retardance layer is to convert the linearly polarized light output by the polarizer 208 into circularly polarized light. This function can be accomplished by using a retardance layer having substantially ¼ wave retardance, placed after the linear polarized output, to induce a phase delay between orthogonal components of linear polarized light emanating from the top polarizer. The retardance is ideally ¼-wave, for all visible light wavelengths emanating the display, however, retardance within +/−5% of the wavelength would be considered to be substantially close to ¼-wave retardance. Note that the level of how circular the light is converted depends on how close to ¼-wave the effective overall retardance is of the retardance layer. For instance, a retardance deviating from ideal ¼ wave retardance will induce a slight ellipticity in the polarization state, thus begin to allow some variation in intensity across the field of view. The level of tolerance on the target ¼-wave retardance is dictated by acceptable level of non-uniformity induced by the level of deviation allowed for the stack design. However, constraining effective retardance of the optical stack after the top polarizer to on order of ¼wave+/−5% or less is expected to enable a fairly acceptable result for applications such as mobile devices. A quarter-wave retardance layer, or film, retards light having polarization aligned along the slow axis of the retardance by a quarter wavelength with respect to light having polarization aligned along the orthogonal, fast axis of retardance. The optic axis typically refers to the extraordinary axis of birefringent media, typically crystalline. Light travels faster through the lower index, and slower through the more optically dense higher index, such that if the extraordinary refractive index is lower than the ordinary index, then the optic axis may be called the fast axis. In order to convert linear polarized light into circularly polarized light out of the full stack, the optic axis of the retardance layer is aligned 45° with respect to the linear polarizer display output polarization axis. Both left-handed and right-handed circular polarization output may be achieved by choice of orientation angle of the rotational alignment of layer, and choice of fundamental retardance, such as positive or negative retardance. By introducing a controlled phase delay between two orthogonal polarization components of the input light, as by use of a uniform, constant, birefringent layer, having substantially constant and uniform in-plane birefringence, the linear polarization state may be converted efficiently and consistently into circular polarization across the field of view of the display.

Various materials can be used for such a layer, including, but not limited to OPTIGRAFIX-brand QW and QWEP grade film, commercially available from Grafix Plastics of Maple Heights, Ohio, and more traditional Polyvinyl alcohol (PVA) laminates, including stretched and stabilized polymers, or films having crystalline-like properties in ordinary and extraordinary index of refraction analogous to uniform in-plane birefringence. OPTIGRAFIX QW and QWEP grade films are single layer polymer films which exhibit uniform in-plane birefringence and may be defined to exhibit an optical path difference in the range of 100 nm to 200 nm for the range of 400 nm to 800 nm input light. For the case of using white LED sources for the display backlight, a typical visible wavelength range of emission may be defined as 420 nm to 680 nm, such that a reasonable choice of quarter wave retardance may be in the range of 105 nm to 170 nm optical path difference (OPD). In order to achieve a reasonable conversion of the display light from linear polarization into circular polarization state, the choice of retardance may be fine tuned based on weighting of the wavelength content transmitting through the display and the photopic response of the eye. Alternatively, an average value may be chosen, such as 550 nm+/− 10 nm. To maintain uniform birefringence for the quarter wave retardance layer, a tolerance is placed on the range of allowed OPD. Films such as the OPTIGRAFIX QW and QWEP films typically have an OPD in the +/−10 nm range. Tradition PVA laminates may also be used to achieve similar retardance to achieve the conversion from linear polarized light into circular polarization.

In one implementation the retardance layer 210 can be installed by an end user or consumer and can be replaceable. It can be manufactured as a protective sheet having three layers: a hard protective coat, a quarter wave plate layer, and a self-wetting adhesive layer.

Example materials for the hard protective coat include acrylic-based ultraviolet light (UV)-initiated polymers or polymers which are cured by exposure to UV, and epoxy hard coats. By way of example, UV-cured polymers may be cured on a surface of a substrate layer in a roll-to-roll process, by use of a master roller having the desired texture for a touch surface and by curing the top coat by exposure to UV light, as either an in situ real-time in-motion process or via a flat mold master to form the surface of sheet during cure process.

Example materials of a self-wetting adhesive include, but are not limited to, a 3M smooth cling films 7717SW, 7718SW, or 7719SW, from 3M Company, or an ADHESIVES RESEARCH self-wetting adhesive or removable adhesive, from Adhesives Research, Inc., of Glen Rock, Pa.

All three materials (hard protective coat, quarter wave plate layer, and self-wetting adhesive layer) have low birefringence. In some cases, two substrates may be laminated together to form a coversheet, such as using the 3M smooth cling film together with a hard-coated retardance layer. As an example, while the adhesive used to adhere these two substrates together may be a transfer adhesive or a double-sided adhesive film, any types of pressure sensitive adhesives can be used so long as the adhesive layer does not exhibit a substantial level of birefringence. An example of transfer adhesive having optical quality is 3M 8212 optically clear adhesive, from 3M Company. Another example of adhesive is OCA optically clear adhesive from Mitsubishi. In some cases, pressure sensitive adhesive may not be desirable, as the pressure used to create adhesion also can impart stress in the material which can increase birefringence. One way to minimize stress during curing is by using and adhesive having low shrinkage and which is compliant. In some cases a liquid cured bond is preferable as it can provide low birefringence. An example of UV initiated optical bond is the VERTAK-brand family of adhesives, including DBA1000 and DBA2100, from E. I. du Pont de Nemours and Company.

The touch-sensitive layer 206 with low birefringence is used. Example materials for this layer also have high transparence and include, but are not limited to: a cyclo olefin polymer (COP) such as ZEONOR film from Zeon Chemicals of Louisville, Ky.; an OC grade optical polymer film called OptiGrafix VLB Grade Optical Base film) from Grafix Plastics, a division of Grafix, Inc. of Cleveland, Ohio. Such materials also have a comparable dielectric constant to PET and can be used in touch screen applications, such as use as a substrate for a conductive layer, such as an ITO layer. Such film may have a birefringence that is less than 15nm/cm over the full spectral range of display light, and less than 10nm/cm over most of that range (i.e., <10nm/cm for range from 450nm to 680nm). As another example of a material that can be used for the ITO layer is triacetate (TAC), such as available from Konica Minolta. By using low birefringence layers for any of the layers within the touch-sensitive layer 206, rainbow effects on the LCD output can be reduced.

Figure 3:
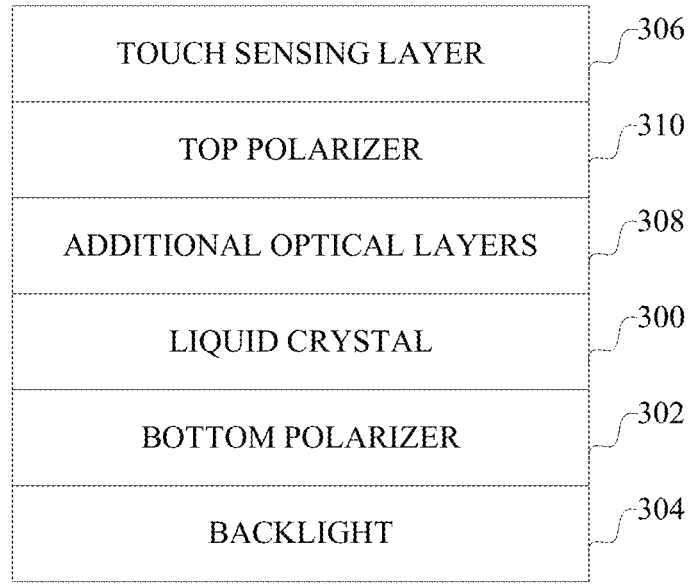
FIG. 3 is a schematic diagram of layers of another example touch sensing liquid crystal display.

In FIG. 3, a schematic diagram of an example layered structure of a touch sensing liquid crystal display will now be described. Similar to FIG. 2, in FIG. 3 a liquid crystal display includes a liquid crystal layer 300, which may include other layers which include the integrated circuitry and patterned conductive transmission lines to control voltages across the gap filled with liquid crystal media, which is typically constructed from one or more layers of different materials as is known in the art, such as a liquid crystal material sandwiched between two glass layers. The liquid crystal layer 300 allows individual pixels to be addressed and activated to emit red, green or blue light in varying intensities so as to give the appearance of different colors, and different brightness, or luminance. The display also can include a bottom linear polarizer layer 302 and a backlight 304, depending on the implementation. On top of the liquid crystal layer is a polarizer 310, and a touch-sensitive layer 306.

In FIG. 3, additional optical layers 308 are disposed between the liquid crystal layer and the analyzer (top polarizer 310) of the display panel in order to flatten the retardance of light emanating from the display at various angles of exiting. These may be placed between the top glass layer within the liquid crystal layer and the top polarizer, as an example. These can include one or more layers, such as a compensation layer that is used to improve viewing angle. These layers are used to achieve substantially flat retardance with respect to viewing angle, such that retardance is substantially constant with respect to viewing angle. Example materials used as compensation layers include, but are not limited to: negative or positive C-plate retardances, negative or positive A-plate retardances, optical thin-film dielectric stacks used as geometric retardances layers, or any combination of these. In this display, the compensation layer also is selected to have controlled birefringence. An example compensation layer can be provided by a TAC-based film (called VA-TAC) available from Konica Minolta. A retardance layer, as shown in FIG. 2 but not shown in FIG. 3, also can be used in the structure of FIG. 3 to provide a circularly polarized output from this display, and can be placed in any order among the layers after the top polarizer.

The desired target retardance of a ¼ wave may be designed to be more constant with respect to viewing angle when incorporating combinations of these various compensation layers, as each media may exhibit different levels of in-plane birefringence as well as out-of-plane birefringence. In such a scenario, the objective is to minimize variation of retardance across the field of view as well as within the range of viewing angles, while also maintaining a constant level of retardance with respect to viewing angle so as to limit artifacts seen when viewing the display through polarized sunglasses. While a combination of compensation films may be disposed between the liquid crystal layer and analyzer polarizer (top polarizer) to improve high angle viewing, the linear-to-circular conversion retardance layer, which is disposed after the linear top polarizer, may additionally be combined with one or more compensating layers in order to trim the retardance with respect to viewing angle. This implementation can be used in cases where a single sheet retardance film is not adequate to maintain circular output within the full range of viewing angles. In other words, a compensation layer can be placed within the two polarizers after the liquid crystal layer, with a conversion retardance layer after the top analyzer polarizer. Additionally, one of more compensation films can be placed after the polarizer, to serve as part of the ¼ wave conversion layer either alone or in combination with a retardance layer, to compensate for any limitation of the choice of ¼ wave retardance film layer, and/or compensate for any limitation of the substrate used for the linear polarizer, depending on orientation direction of the polarizer sheet/layer. Because both the touch sensing layer and retardance layer are after the top polarizer, in the examples shown, the retardance layer may be placed either above or below the touch sensing layer, and still achieve effective retardance substantially near ¼ wave, since these layers comprise media and films having low birefringence.

Other layers in the optical stack, such as those that provide bonding, a substrate, protective layer or the like, also have low birefringence. In a display using PET, such layers can be replaced by a cyclo olefin polymer such as ZEONOR film or OptiGrafix VBL Optical Grade base film. In a display using pressure sensitive adhesives, a liquid curing adhesive can be used instead to reduce birefringence.

By ensuring that the components in the optical stack, including the touch-sensing layer, adhesive layers, substrates, protective layers and the like, have low birefringence, any rainbow effect created by polarizing such light (and exacerbation of this effect from other polarizing media such as sunglasses) can be reduced. In addition, by applying an effective ¼ wave retardance to the output of the LCD top polarizer, a circularly polarized output can be provided, making the display consistently visible from a variety of viewing angles, even when viewed through other polarizing media such as sunglasses.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A touch sensing liquid crystal display, comprising:
   a liquid crystal layer;
   a capacitive touch sensing layer comprising a plurality of layers including at least a transparent conductive layer and a transparent substrate, wherein the plurality of layers comprising the touch sensing layer together are comprised of low birefringence materials;
   a top polarizer formed between the liquid crystal layer and the capacitive touch sensing layer and which receives light from the liquid crystal layer and outputs linearly polarized light to be passed through the touch sensing layer; and
   a retardance layer formed on the capacitive touch sensing layer and having substantially ¼ wave retardance, placed after the linear polarized output, to induce a phase delay between orthogonal components of linear polarized light emanating from the top polarizer.

2. The touch sensing liquid crystal display of claim 1, further comprising:
   a compensation layer formed between the liquid crystal layer and the top polarizer and providing substantially flat retardance with respect to viewing angle.

3. The touch sensing liquid crystal display of claim 1, wherein the liquid crystal layer includes a plurality of layers, each with low birefringence.

4. The touch sensing liquid crystal display of claim 3, wherein at least one of the plurality of layers is a protective layer.

5. The touch sensing liquid crystal display of claim 3, wherein at least one of the plurality of layers is an adhesive layer.

6. The touch sensing liquid crystal display of claim 1, further comprising a backlight on an opposite side of the liquid crystal layer from the top polarizer.

7. The touch sensing liquid crystal display of claim 1, further comprising a bottom polarizer formed on an opposite side of the liquid crystal layer from the top polarizer.

8. The touch sensing liquid crystal display of claim 1, wherein the substrate of the touch sensing layer comprises a cyclo olefin polymer.

9. The touch sensing liquid crystal display of claim 1, wherein the retardance layer includes a material providing retardance and a compensation layer providing for substantially flat retardance with respect to viewing angle, wherein combined retardance of the retardance layer and compensation layer is substantially ¼ wave retardance, placed after the linear polarized output, to induce a phase delay between orthogonal components of linear polarized light emanating from the top polarizer.

10. The touch sensing liquid crystal display of claim 1 wherein at least one of the low birefringence materials has a birefringence of less than 15 nm/cm.

11. The touch sensing liquid crystal display of claim 1, wherein low birefringence means a birefringence of less than 15 nm/cm.

12. A touch sensing horizontally oriented display table, comprising:
    a housing;
    a plurality of layers mounted in the housing, the plurality of layers comprising:
       a liquid crystal layer;
       a capacitive touch sensing layer comprising a plurality of layers including at least a transparent conductive layer and a transparent substrate, wherein the plurality of layers comprising the touch sensing layer together are comprised of low birefringence materials;

a top polarizer formed between the liquid crystal layer and the capacitive touch sensing layer and which receives light from the liquid crystal layer and outputs linearly polarized light to be passed through the touch sensing layer; and a retardance layer formed on the capacitive touch sensing layer and having substantially ¼ wave retardance, placed after the linear polarized output, to induce a phase delay between orthogonal components of linear polarized light emanating from the top polarizer, wherein the retardance layer provides both a touch surface and viewing surface for the display table.

13. The touch sensing horizontally oriented display table of claim 12, further comprising:

a compensation layer formed between the liquid crystal layer and the top polarizer and providing substantially flat retardance with respect to viewing angle.

14. The touch sensing horizontally oriented display table of claim 12, wherein the liquid crystal layer includes a plurality of layers, each with low birefringence.

15. The touch sensing horizontally oriented display table of claim 14, wherein at least one of the pluralities of layers is a protective layer.

16. The touch sensing horizontally oriented display table of claim 14, wherein at least one of the pluralities of layers is an adhesive layer.

17. The touch sensing horizontally oriented display table of claim 12, further comprising a backlight on an opposite side of the liquid crystal layer from the top polarizer.

18. The touch sensing horizontally oriented display table of claim 12, further comprising a bottom polarizer formed on an opposite side of the liquid crystal layer from the top polarizer.

19. The touch sensing horizontally oriented display table of claim 12, wherein the substrate of the touch sensing layer comprises a cyclo olefin polymer.

20. The touch sensing horizontally oriented display table of claim 12, wherein the retardance layer includes a material providing retardance and a compensation layer providing for substantially flat retardance with respect to viewing angle, wherein combined retardance of the retardance layer and compensation layer is substantially ¼ wave retardance, placed after the linear polarized output, to induce a phase delay between orthogonal components of linear polarized light emanating from the top polarizer.

21. The touch sensing horizontally oriented display table of claim 12 wherein at least one of the low birefringence materials has a birefringence of less than 15 nm/cm.

22. The touch sensing horizontally oriented display table of claim 12, wherein low birefringence means a birefringence of less than 15 nm/cm.

\* \* \* \* \*